(No Model.) 3 Sheets—Sheet 1.
P. R. GRABILL.
GRAIN SCALES.
No. 440,613. Patented Nov. 11, 1890.
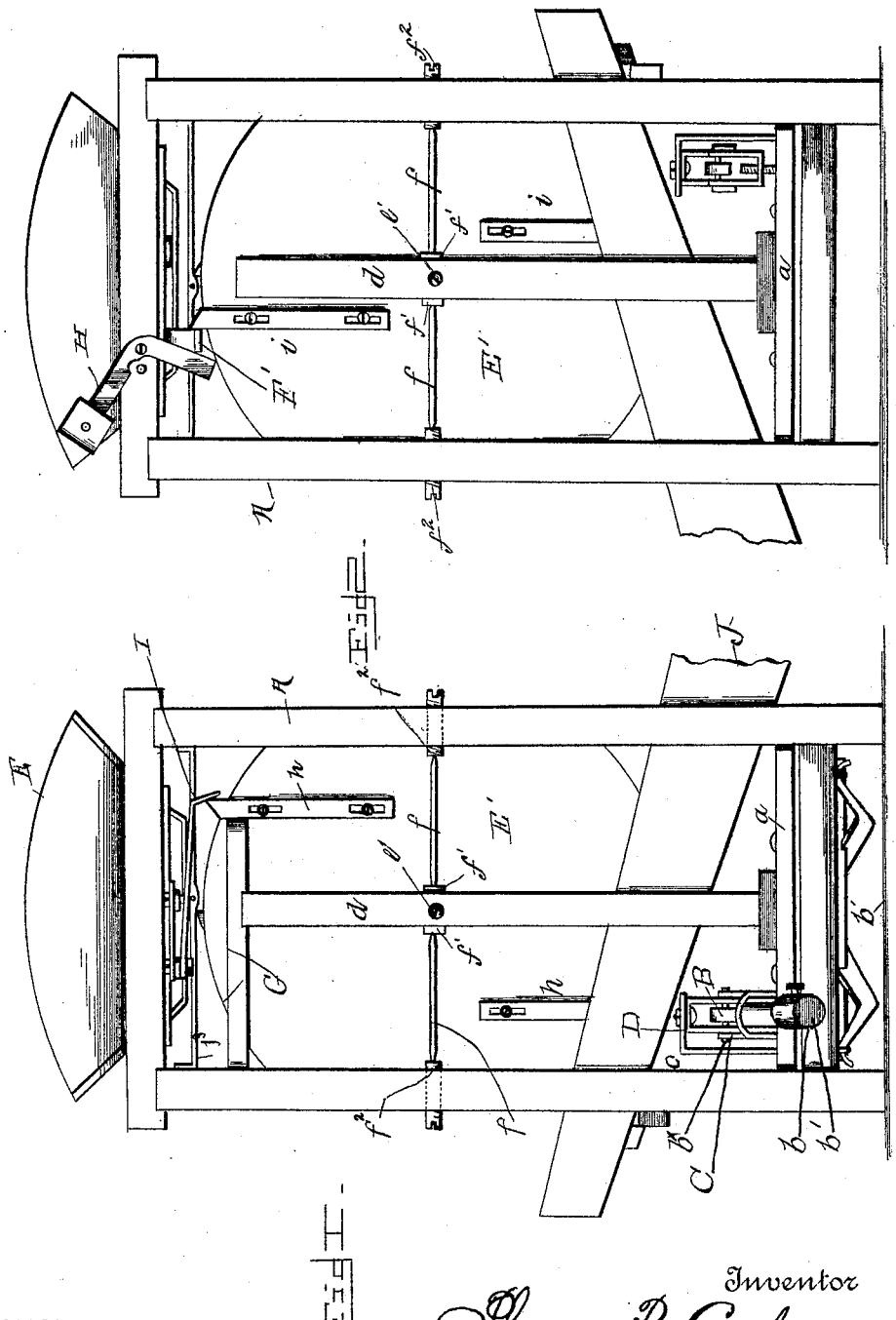

(No Model.) 3 Sheets—Sheet 2.
P. R. GRABILL.
GRAIN SCALES.
No. 440,613. Patented Nov. 11, 1890.
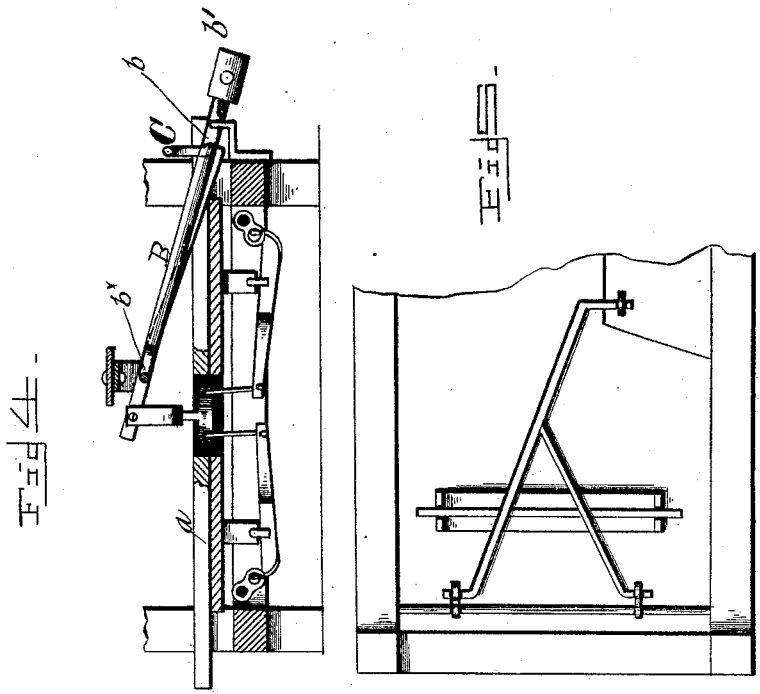
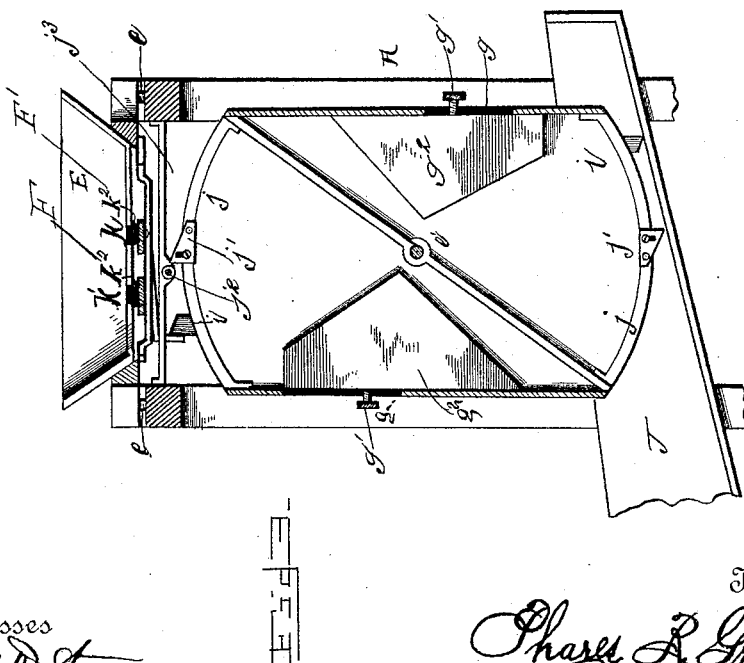
Witnesses
Paul D. Stevens
Josef A. Hagmann
Inventor
Charles R. Grabill
By Myers & Co
Attorneys (No Model.) 3 Sheets—Sheet 3.
P. R. GRABILL.
GRAIN SCALES.
No. 440,613. Patented Nov. 11, 1890.
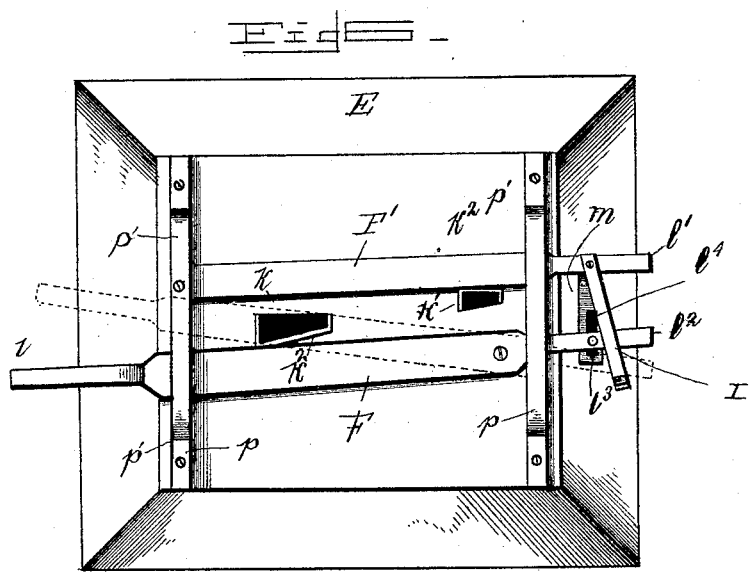
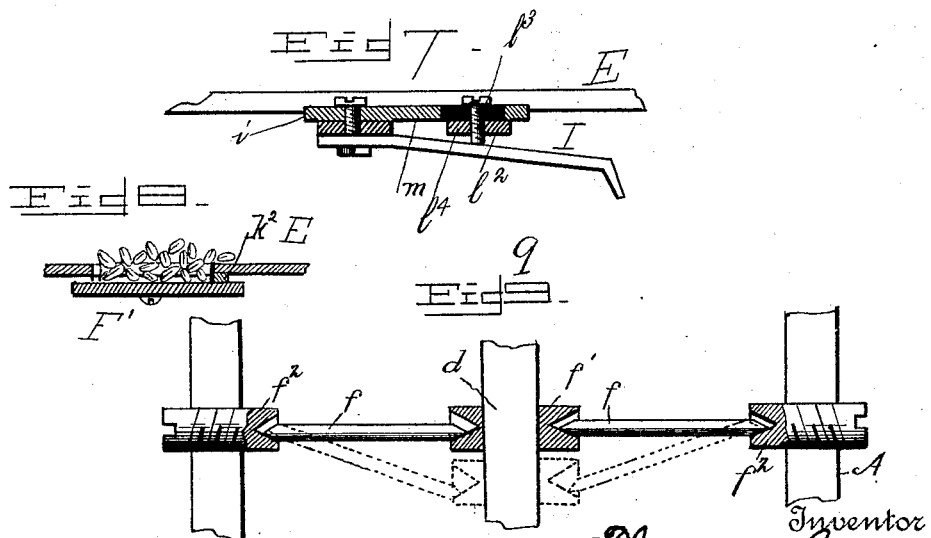
Witnesses
Paul D. Stevens
Joseph A. Hagmann
Inventor
Sherd R. Grabill
By Myers & Co.
Attorneys.

UNITED STATES PATENT OFFICE.

PHARES R. GRABILL, OF MILLERSBURG, PENNSYLVANIA.

GRAIN-SCALES.

SPECIFICATION forming part of Letters Patent No. 440,613, dated November 11, 1890.

Application filed September 10, 1889. Serial No. 323,579. (No model.)

*To all whom it may concern:*

Be it known that I, PHARES R. GRABILL, a citizen of the United States of America, residing at Millersburg, in the county of Dauphin and State of Pennsylvania, have invented certain new and useful Improvements in Grain-Measurers, of which the following is a specification, reference being had therein to the accompanying drawings.

This invention relates to certain improvements in scales or meters for weighing, among other things, grain, grass, seed, coal, tea, bran, salt, beans, &c., having for its object, in general, to effect the weighing and registering operation automatically, and in particular to regulate or taper off the feeding of the grain or other substance from the hopper to the measuring vessel or receptacle near the filling-point of the latter, or the predetermined amount therefor, especially as is necessary when absolute accuracy is desired; and to these ends the invention consists of the novel combination and construction of parts, as will fully appear from the following description and accompanying illustration, in which—

Figures 1 and 2 are opposite side elevations of my invention, only a slight portion of the chute J being broken away. Fig. 3 is a partial vertical section thereof, the chute J also being broken away. Fig. 4 is an enlarged partially sectional and partially side view of the scale-beam and its adjunctive parts. Fig. 5 is an inverted plan view of one of the said adjunctive parts of the scale-beam. Fig. 6 is an inverted view of the hopper, showing more particularly the cut-offs of the openings thereof. Fig. 7 is a detail view of the tripping or shifting mechanism of the hopper-opening cut-offs. Fig. 8 is a similar view of one of the discharge-openings and its cut-off of the hopper, and Fig. 9 is also a detail view showing more especially the form of flexible joint-connection between the weighing vessel or receptacle supporting-standards and their braces.

In the embodiment of my invention I employ the usual upright supporting frame or stand A, within the base of which is placed suitable platform-scales, $a$ being the platform and B the scale-beam. The scale-beam B is preferably hollow and contains a quantity of mercury $b$, and has upon its outer end an adjustable weight $b'$ to regulate the quantity of grain weighed each time the weighing or measuring vessel is tilted or dumped. The mercury $b$ also acts as a weight, which naturally moves toward whichever may become the lower or tilted end of the beam in the weighing operation, thus transferring weight from end to end of the beam during said operation.

C is a check or stop, which consists of a yoke or bail-lever, which has its fulcrum on or in the scale-beam B, as $b^\times$, near the pivotal point of the latter, and is adapted to stand astride of and engage the outer end of the scale-beam, the outer end portion of said bail-lever standing at right angles to the general plane of the lever. The check or stop lever C normally rests upon the platform $a$ and is designed to have engagement with and transfer its weight to the scale-beam B when the latter has arisen slightly above a certain point, thus arresting the upward movement of the scale-beam until sufficient weight is put on the weighing vessel or receptacle in the process of filling the same to lift the beam with said check or stop lever, the maximum upward movement of the beam being determined by a stop, presently described.

D is the stop just referred to, which is secured at its inner end to the overhanging arm or portion of a right-angled bracket $c$, fastened to the base of the frame or stand A, the outer end of said stop standing in the plane of the movement of the scale-beam.

E is the hopper, which may be raised or lowered by turning the screw-bolts $e$ in the required direction for adjusting the action of the tilting and revolving receptacle.

E' is the weighing or measuring vessel or receptacle, which is divided into two compartments.

The receptacle or vessel E' is hung or pivoted upon a rod or pivot $e'$ between standards $d$, bolted or secured to the scale-platform $a$. To the pivot or rod $e'$, outside of the supporting-frame A, is designed to be applied or connected suitable registering mechanism to register each time the receptacle or vessel is tilted, thus producing a registration of the grain or other merchandise or substance measured out by the vessel or receptacle. The standards $d$ are suitably braced or held in position near their upper ends by brace rods or stays $f$, centered or tapered at their ends, which bear or pivot in socket-plates $f'$ $f'$, bolted to the standards and in countersinks or sockets of set-screws $f^2 f^2$, working in the uprights of the frame A, thus providing flexible or frictionless joint-connections between the several parts.

The receptacle or vessel E' is provided with slots $g$, through which pass adjusting or set screws $g'$, engaging blocks $g^2$, either hollow or solid, upon the inside of the receptacle or vessel to relatively adjust the center of gravity to the pivotal or axial point of the latter.

The vessel or receptacle E' is provided upon one side with adjustable studs or projections $h\ h$, one projecting slightly beyond each end, but in planes at opposite sides of the pivots or axis of the vessel or receptacle. Upon the opposite side of the receptacle or vessel E' are adjustable studs or projections $i\ i$, one projecting from each end of the latter and otherwise similarly arranged thereon, as the studs or projections $h\ h$, the function of both which series of studs will appear farther on.

Across each end of the receptacle or vessel E', and fastened to the front and back thereof, is a curved bar or arch $j$, carrying about at its center a stud or projection $j'$. This stud or projection engages, when the receptacle E' is in an upright position, a frictional roll $j^2$, centrally depending or hung upon a bar $j^3$, fastened to opposite upper cross-bars of the frame A, thus preventing the receptacle or vessel while being filled from rotation or dumping.

In the bottom of the hopper E, at one side thereof and about in line with its center, is a main feed-opening $k$, while at the opposite side and a little out of alignment with the feed-opening $k$ is a supplemental feed-opening $k'$.

F F' are cut-offs or slides, which are pivoted at opposite ends to the under side of the hopper-bottom, and which are adapted to cover or close the feed-openings $k\ k'$, respectively. These cut-offs or slides are provided with oppositely-projecting end studs or arms $l\ l'$, and are connected together by a link or bar $m$, having one end connected to the end stud or projection $l'$ and to an opposite similar end stud or projection $l^2$ on the cut-off or slide F. The connection between the end stud or projection $l^2$ and the link or bar $m$ is effected by means of a pin or bolt $l^3$, projecting from said stud or projection and engaging a slot $l^4$ in said link or bar $m$. This allows the slides or cut-offs F F' to have a limited independent movement, whereby one slide F is permitted to wholly close the main feed-opening $k$ and not affect the slide F'. The supplemental feed-opening $k'$ will thus be kept open after the closing of the main feed-opening to reduce or taper off the feeding of the contents of the hopper to the receptacle or vessel E' near the filling-point of the latter or when the required amount of grain or other substance has been about fed thereto, as will more fully appear presently.

G is a spring projecting from the frame A and separately engaging each stud or projection $h\ h$ to prevent, after the rotation of the receptacle or vessel E' and it has gained an upright position, the reverse movement of said receptacle or vessel.

H is an L-shaped weighted lever hung on the frame A and adapted to engage the slide of cut-off F' of the hopper E, as will be explained farther on.

I is a catch or hook carried by the stud $l'$ of the cut-off F' and having its beak or lip adapted to engage the normally upper stud $h$ of the receptacle E' when the amount of grain fed into the receptacle is sufficient to effect the tilting of the latter.

The operation is as follows: The weight $b'$ on the scale-beam B is adjusted so that when the upper compartment or chamber of the receptacle or vessel E' has received a predetermined quantity of the substance to be weighed or measured the weight of the thus-loaded chamber will overbalance the weight $b'$. The scale-beam B will now rise and when above a certain point will engage the check or stop lever C, and its movement thus be arrested. The upper stud or projection $i$, which had engaged the cut-off or slide F', will have descended sufficiently to allow the said slide or cut-off to slip over it, while the slide or cut-off being engaged in an opposite direction by the lever H will instantly be carried forward and close the main feed-opening $k$. The supplemental feed-opening $k'$, however, still being open, as before stated, the feeding operation will continue, but much more slowly, a few grains passing or being fed at a time, as in accurate hand-weighing, until the weighted end of the scale-beam, which has now become materially lightened at its outer end, (the mercury or other weight in the beam having rolled or moved to the inner lower end of said beam,) rises, carrying with it the check or stop lever until the stop D is engaged. The stud or projection $j'$ on the bar or arch $j$ of the receptacle or vessel E', which engaged the roller $j^2$ of the arch or bar $j^3$, will now have become disengaged from said roller and allow the receptacle or vessel to tilt forward and dump its contents into a chute J, arranged in the frame A immediately below it. Simultaneously the supplemental feed-opening $k'$ will be closed by the engagement of the upper stud or projection $h$ with the catch or hook I. As the receptacle or vessel E' is emptied, the weight $b'$ on the beam B will cause the receptacle or vessel to again assume an upright position, having made a semi-rotation. The now upper one of the studs or projections $i$ will engage and operate the cut-off F', which will have the effect to also operate the cut-off F, opening both feed-openings $k\ k'$ in the hopper-bottom, feeding the contents of the hopper to the other chamber of the vessel or receptacle E', as in filling the first-referred-to chamber thereof. Said projection will drop out of engagement with the cut-off when the desired amount of grain is received into the receptacle E', thus bringing the other similar projection into engagement with said cut-off. For less accurate and more speedy weighing the check or stop lever C is removed, the lever H disposed out of the way, the connection between the link or plate $m$ and the cut-off F changed from the slot $l^4$ of said link to the pivotal point or aperture $n$ of said link, the connection of the hook or catch I with the cut-off F shifted to the point or aperture $o$ in said catch, and the supplemental feed-opening $k'$ closed. This arrangement will do speedy work and equal to hand-weighing, my invention thus being adapted to do work more than in one way.

It will be seen that I provide opposite side edges and ends (the side edges more distant from the center of the bottom of the hopper) of the feed-openings $k\,k'$ with rims of flanges $k^2$, which project downward a short distance from the bottom of the hopper—say a little more than the thickness of the grain—to be dropped or fed through said openings, the purpose of which is to prevent grain remaining on the levers from being crushed, and thus stopping the operation of the device. This arrangement, it will be seen, gives the seed ample room for space to pass out of the feed-openings $k\,k'$ and remove the cut-offs from immediate contact with the hopper-bottom, thus preventing the possible wedging of the seed between said cut-offs and the hopper and the clogging of the cut-offs.

$p\,p$ are ways or rails fastened to the under side of the bottom of the hopper E, and are in depth about equal to that of the rims or flanges $k^2$ of the feed-openings, and between said ways and guide rods or bars $p'$, underhanging and connecting with them, slide the cut-offs or slides F F', the latter thus being adapted to clear said rims or flanges or guides in their movement.

Having thus fully described my invention, what I claim, and desire to secure by Letters Patent, is—

1. In grain-weighing scales, the hopper supported upon vertically-adjustable lugs, the main and supplemental feed-openings, the levers or cut-offs for closing the same, pivoted at opposite ends and connected at one end by a slotted link, the stop connected to said link, and the mechanism for operating said levers or cut-offs, substantially as shown and described.

2. In grain-weighing scales or meters, the combination, with the tilting or revolving receptable or vessel, the standards secured to the scale-platform and the supporting-frame, of the pivoted stay rods or braces centered or pivoted in socket-plates applied to said standards and in sockets in screw-bolts working in uprights of said frame, substantially as specified.

3. In grain-weighing scales or meters, the combination, with the revolving or tilting vessel or receptacle having upon its sides and projecting from its ends studs or projections, of the hopper having upon its under side pivoted cut-offs or slides closing main and supplemental feed-openings and connected together at one end by a link or bar pivoted at one end to one cut-off or slide and having a pin or projection and slot-connection at its other end with the other cut-off or slide, substantially as set forth.

4. In grain-weighing scales or meters, the combination of the revolving or tilting receptacle or vessel having upon its sides projections or studs standing beyond its ends, the hopper having in its bottom main and supplemental openings, pivoted cut-offs or slides connected together by a link or bar pivoted to one cut-off or slide, and having a slot-and-pin projection connected with the other slide or cut-off, and the hook or catch pivoted at one end to one cut-off or slide and having at its opposite end a beak or lip engaging one of the studs or projections of said receptacle or vessel, substantially as set forth.

5. In grain-weighing scales or meters, the combination, with the hopper having main and supplemental feed-openings, of the cut-offs or slides for said openings, the slotted link or bar having interchangeable pivotal connections with one cut-off or slide, and the catch or hook having its beak or lip projecting below one of said cut-offs or slides and interchangeable connections with the other cut-off or slide, substantially as set forth.

6. In grain-weighing scales or meters, the combination of the revolving or tilting receptacle or vessel having at its sides end projecting studs or projections and across its ends curved bars carrying central studs or projections, the supporting-frame having at its upper end a curved bar or arch provided about at its center with a roll engaged by the latter stud or projection, the weighted L-shaped lever hung on said frame, the receptacle-supporting standard, the platform-scales upon which said standards are secured and having a hollow weighted scale-beam containing mercury or other heavy substance, the bail-shaped right-angled lever-check, the stop standing in the plane of the movement of said scale-beam, the hopper adjustably mounted upon said frame and having main and supplemental feed-openings in its bottoms, the pivoted cut-offs or slides for said openings, having a slotted pin-and-link connection with one cut-off and a pivotal connection with the other cut-off or slide, and the catch or hook pivoted to one of said cut-offs or slides and having a beak or lip depending therefrom, substantially as shown, and for the purpose described.

7. In grain-weighing scales, the tilting or revolving receptacle pivoted to standards and having a diagonal partition and the adjustable blocks, the floor supporting the standards, and the scale-beam and its check, consisting of a right-angled yoke or bail-lever pivoted at the fulcrum of said beam and adapted to stand astride and engage the outer end of the beam, substantially as shown and described.

8. In grain-weighing scales, the tilting or revolving receptacle pivoted to standards supported by the movable floor, the socketed brace-rods and the hollow scale-beam having an adjustable weight, and the check pivoted to said scale-beam, substantially as shown and described.

9. In grain-weighing scales, the hollow scale-beam inclosing a rolling weight, said beam being pivoted at one end and pivotally supported by an overhanging L-shaped piece, the check pivoted in the end of said lever, and the standards supporting the tilting or revolving receptacle, substantially as shown and described.

10. In grain-weighing scales or meters, the hollow scale-beam inclosing a rolling or sliding weight and the check pivoted at the fulcrum of said lever or beam, substantially as shown and described.

11. In grain-weighing scales or meters, the hollow scale-beam inclosing a quantity of mercury, carrying an adjustable weight at its free end, and having a check or stop pivoted at the fulcrum of said beam, substantially as shown and described.

12. In grain-weighing scales, the hopper having main and supplemental feed-openings, the cut-offs for said openings, the lugs or projections, the approximately-L-shaped weighted lever, the tilting or revolving receptacle having adjustable blocks, the standards having the socketed brace-rods, the scale-beam and its check, and the movable floor, substantially as shown and described.

13. In grain-weighing scales, the tilting or revolving receptacle having adjustable block-weights and the curved bars carrying lugs engaging a roller on a similar bar, said receptacle being supported by standards connected to a movable floor, substantially as shown and described.

In testimony whereof I affix my signature in presence of two witnesses.

PHARES R. GRABILL.

Witnesses:
H. A. VEITZ,
GEO. W. KLINE.